G. W. PITTMAN.

Hemp-Hatcheling Machines.

No. 5,905. Reissued June 2, 1874.

WITNESSES.

Edw^d Payson

Geo. H. Miatt

INVENTOR.

George W. Pittman per Edw. E. Quimby

Atty.

AM. PHOTO-LITHOGRAPHIC Co. N.Y. (OSBORNE'S PROCESS.)

UNITED STATES PATENT OFFICE.

GEORGE W. PITTMAN, OF BROOKLYN, NEW YORK, ASSIGNOR, BY MESNE ASSIGNMENTS, TO SAMUEL I. THURSBY AND THE TODD AND RAFFERTY MACHINE COMPANY.

IMPROVEMENT IN HEMP-HATCHELING MACHINES.

Specification forming part of Letters Patent No. 116,092, dated June 20, 1871; reissue No. 5,905, dated June 2, 1874; application filed May 11, 1874.

*To all whom it may concern:*

Be it known that I, GEORGE W. PITTMAN, of Brooklyn, Kings county, State of New York, have invented certain Improvements in Machines for Hatcheling and Drawing Hemp, &c., of which the following is a specification:

In hatcheling hemp, the hank or mass of fiber is usually cleaned and drawn out by hand upon a stationary comb, and then wound upon a cylinder called a lapper, from which it is taken off by hand, still in the form of a hank. Efforts have heretofore been made to devise machinery for these operations capable of delivering the fiber in a sliver instead of a hank. For this purpose machines have been made for subjecting fiber to the action of belts of gill-bars. Cylinders containing gill-bars have been employed in connection with feeding and delivery rollers. Such machines have not proved successful, because of their liability to get out of order, and the inefficiency of their action in opening and combing the fibers sufficiently for the purpose required.

My invention relates to that class of hatchelers in which are employed two combing-cylinders revolving with different velocities, and acting in combination with friction-rollers, the cylinders, respectively, and the friction-rollers, being arranged to revolve with successive increments of speed, so as to subject a hank or mass of fibers fed into the machine to a series of drawing and combing processes in a single continuous operation, whereby the fibers composing the hank are effectually straightened and drawn out preparatory to their discharge from the machine through a suitably-arranged guiding-trough and delivery-rollers in the form of a continuous sliver or roving suitable for use in the manufacture of rope, cordage, &c. My invention consists in providing the secondary or quicker-moving cylinder with rows of inclined teeth instead of the radial teeth heretofore used, by which means the conjunctive action of the comb-cylinders is greatly improved in efficiency, and the sliver is more easily and certainly withdrawn by the delivery-rollers.

Figure 1:
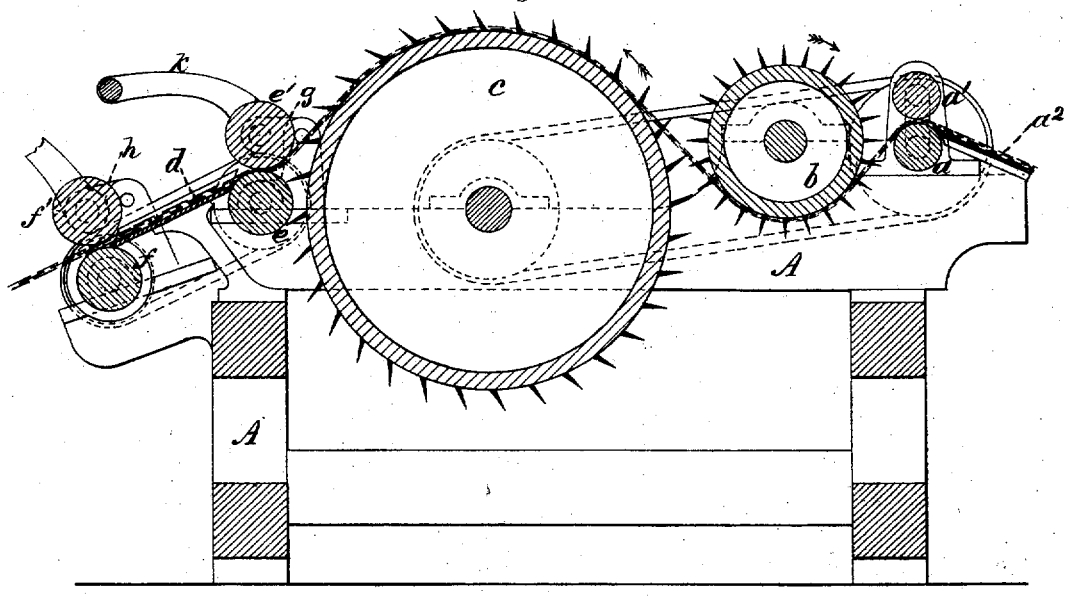
Figure 2:
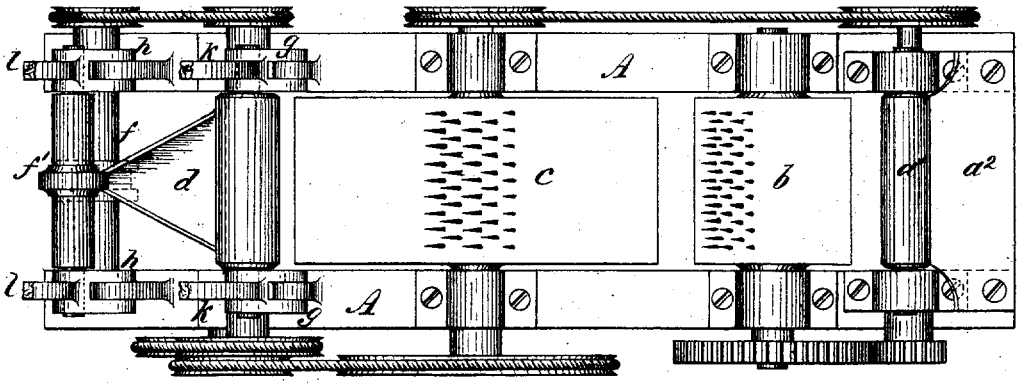

The accompanying drawings are as follows: Figure 1, a vertical section of my machine; and Fig. 2, a plan of the same.

A stout frame, A, furnishes bearings for the slower moving comb-cylinder *b*, provided with rows of pointed teeth projecting radially from its periphery, and the quicker-moving cylinder *c*, provided with rows of inclined teeth. A pair of friction-rollers, *e* and *e'*, are mounted in suitable relation to the quicker moving or second comb-cylinder, and revolve with sufficient velocity to enable them to act in drawing the fibers therefrom and discharging them into a converging trough, *d*, by which they are guided to the grooved delivery-rollers or sliver-rollers *f* and *f'*. The upper rollers *e'* and *f'* are, respectively, mounted in swinging bearings *g* and *h*, so that they may be lifted by means of the bars *k* and *l*, or weighted, if required, to enable them to exert the necessary downward pressure. At the opposite end of the machine is another pair of friction-rollers, *a* and *a'*, which may be used when required for regulating the feeding of the hank of fibers which is to be operated upon. The friction-rollers and the combing-cylinders are to be driven at their proper relative speeds by suitable belts and pulleys or trains of gear. The feed-rollers *a* and *a'* are used when it is required to hold back the hank and increase the drawing effect of the first comb-cylinder *b*. In some cases the feed-rollers may be dispensed with, the weight of the fibers, and their friction in moving across the guide-board $a^2$, affording sufficient resistance to the preliminary pulling operation effected by the initial penetration into them of the radial comb-teeth. The comb-cylinder *b* holds back the fibers from the inclined comb-teeth, and the rotation of the second cylinder, therefore, effects a second pulling operation. By this means the radial comb-teeth are made to comb and straighten the fibers, and at the same time the holding back of the hank by the first comb-cylinder causes the inclined teeth to produce a like effect in their initial action upon the fibers. The inclination of the teeth in the secondary cylinder both causes them to penetrate the hank easily and quickly, and thus instantly and completely engage the fibers, so as to pull them from the primary cylinder, and also facilitates the disengagement of the mass of fibers from the secondary cylinder. The friction-rollers *e* and *e'* engage the fibers as they pass from the second comb-cylinder, and revolve with such velocity as to subject them to a third pulling operation, and a final combing and straightening by the inclined teeth.

It will thus be seen that my machine performs several pulling or drawing and combing operations successively. This series of continuous processes effectually straightens out the fibers, and causes them to be delivered by means of the guiding-trough and grooved rollers in the form of a continuous sliver.

The attenuation of the hank by these combing and pulling processes is thus effected without the risk of the fibers being knotted or delivered in masses, as in the gill-bar machines hereinbefore mentioned.

I claim—

The cylinder *b* armed with pointed radial teeth, and the cylinder *c* armed with pointed inclined teeth, the latter revolving at a quicker speed than the former, so as to comb and draw the fiber, in combination with drawing-rollers *e e'* revolving at a still quicker speed, substantially as and for the purpose specified.

GEO. W. PITTMAN.

Witnesses:
J. C. TODD,
JOHN G. CARNEY.